United States Patent
Ahn et al.

(10) Patent No.: US 8,300,959 B2
(45) Date of Patent: Oct. 30, 2012

(54) TRANSPORT STREAM STRUCTURE OF IMAGE DATA HAVING ADDITIONAL INFORMATION INSERTED, AND METHOD AND APPARATUS FOR TRANSMISSION AND RECEPTION THEREOF

(75) Inventors: Chang-sup Ahn, Seoul (KR); Jun-bum Shin, Suwon-si (KR); Bong-seon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1265 days.

(21) Appl. No.: 12/046,492

(22) Filed: Mar. 12, 2008

(65) Prior Publication Data

US 2008/0279464 A1    Nov. 13, 2008

(30) Foreign Application Priority Data

May 10, 2007    (KR) .................... 10-2007-0045425

(51) Int. Cl.
  *G06K 9/36*    (2006.01)
(52) U.S. Cl. ........................................ 382/232
(58) Field of Classification Search .......... 382/232–251; 709/247; 375/240.01–240.29; 370/260, 370/266; 341/60, 65, 67; 386/239–241
See application file for complete search history.

(56) References Cited

U.S. PATENT DOCUMENTS

| | | | | |
|---|---|---|---|---|
| 5,371,547 | A * | 12/1994 | Siracusa et al. | 375/240.01 |
| 5,835,730 | A * | 11/1998 | Grossman et al. | 709/247 |
| 7,583,843 | B2 * | 9/2009 | Mossakowski | 382/232 |
| 7,675,872 | B2 * | 3/2010 | Zhu | 370/260 |
| 7,848,621 | B2 * | 12/2010 | Eklund et al. | 386/240 |
| 8,160,422 | B2 * | 4/2012 | Fujinami et al. | 386/241 |

* cited by examiner

*Primary Examiner* — Ishrat I Sherali
(74) *Attorney, Agent, or Firm* — Sughrue Mion, PLLC

(57) ABSTRACT

Provided are a transport stream structure of image data, a transmitting and receiving apparatus and method thereof. A transport stream structure of image data includes a header compressed by a lossless compression algorithm; an additional information field for additional information of image data, the additional information field being generated based on compressing the header by using the lossless compression algorithm; and a payload including the image data. The transport stream structure of the image data, the transmitting and receiving apparatus and method thereof enables inserting the additional information without changing the size of the related art transport stream structure of the image data.

47 Claims, 6 Drawing Sheets

TRANSPORT STREAM STRUCTURE OF IMAGE DATA HAVING ADDITIONAL INFORMATION INSERTED, AND METHOD AND APPARATUS FOR TRANSMISSION AND RECEPTION THEREOF

CROSS-REFERENCE TO RELATED PATENT APPLICATION

This application claims priority from Korean Patent Application No. 10-2007-0045425 filed on May 10, 2007, in the Korean Intellectual Property Office, the disclosure of which is incorporated herein in its entirety by reference.

BACKGROUND OF THE INVENTION

1. Field of the Invention

Methods and apparatus consistent with the present invention relate to a transport stream structure of image data and transmission and reception thereof, and more particularly, to a transport stream structure of image data having additional information inserted therein and transmission and reception thereof.

2. Description of the Related Art

Compressed images, such as a Moving Picture Experts Group (MPEG) image or an H.264 image, are encoded according to a predetermined standard for storage or transmission. Although, the encoding standard was originally developed in accordance with scalability and generality, it is necessary that additional information is transmitted together with an encoded image in order to provide services corresponding to various business models.

FIG. 1 illustrates a general transport stream structure of image data.

Referring to FIG. 1, the general transport stream structure of image data includes a header 102 and a payload 104. The header 102 of the transport stream includes various types of control information for reproducing image data included in the payload 104. For example, a codec for a compressed image such as an MPEG generates a 188 byte MPEG2 transport stream packet which is composed of the header 102 and a compressed image data part (namely, the payload 104).

However, methods such as transmitting additional information as a separate file, for example a subtitle file, should be used in order to transmit the additional information. Thus, it is necessary to transmit additional information by inserting the additional information into an encoded compressed image.

SUMMARY OF THE INVENTION

The present invention provides a transport stream structure, and a transmitting and receiving apparatus and method, which enables inserting additional information into a transport stream packet of image data.

According to an aspect of the present invention, there is provided a transport stream structure of image data, the structure including a header compressed by a lossless compression algorithm; an additional information field including additional information, the additional information field being generated as a result of compressing the header by using the lossless compression algorithm; and a payload including the image data.

The image data may be compressed by a Moving Picture Experts Group (MPEG) or a H.264 standard.

The lossless compression algorithm may include any one of a Huffman coding algorithm, a deflate compression algorithm, an arithmetic coding algorithm, and an entropy coding algorithm.

According to another aspect of the present invention, there is provided an apparatus for transmitting image data, the apparatus including an encoding unit receiving the image data and encoding the image data to a transport stream packet including a header; a compressing unit compressing the header in the transport stream packet by using a lossless compression algorithm; and an additional information inserting unit inserting additional information in an additional information field generated as a result of compressing the header by using the lossless compression algorithm.

The apparatus for transmitting image data may further include a transmitting unit transmitting the transport stream output from the additional information inserting unit.

The apparatus for transmitting image data may further include a storage unit storing a transport stream having the additional information inserted.

The apparatus for transmitting image data may further include a user interface unit providing an interface for receiving additional information inserted by a user using the additional information inserting unit.

The apparatus for transmitting image data may further include an additional information controlling unit enabling the compressing unit and the additional information inserting unit only when there is additional information to be transmitted.

The apparatus for transmitting image data may further include a metadata generating unit generating metadata indicating a number of transport stream packets having the additional information inserted.

According to another aspect of the present invention, there is provided an apparatus for receiving image data, the apparatus including an additional information extracting unit receiving a header compressed by using a lossless compression algorithm and a transport stream packet including additional information in an additional information field generated as a result of compressing the header by using the lossless compression algorithm; a restoring unit restoring the compressed header to the original header; and a decoding unit receiving a transport stream packet including the original header and decoding the transport stream to generate the image data.

The apparatus for receiving image data may further include a receiving unit receiving a transport stream packet including a header compressed by the lossless compression algorithm and additional information.

The apparatus for receiving image data may further include a storage unit storing the image data decoded by the decoding unit.

The apparatus for receiving image data may further include a metadata extracting unit extracting metadata indicating a number of transport stream packets having the additional information inserted.

The apparatus for receiving image data may further include an additional information controlling unit enabling the additional information extracting unit and the restoring unit, based on the extracted metadata.

According to another aspect of the present invention, there is provided a method of transmitting image data, the method including receiving the image data and encoding the image data to a transport stream packet including a header; compressing the header in the transport stream packet by using a lossless compression algorithm; and inserting additional information in an additional information field generated as a result of compressing the header by using the lossless compression algorithm.

According to another aspect of the present invention, there is provided a method of receiving image data, the method including receiving a transport stream packet including a header compressed by using a lossless compression algorithm and additional information inserted in an additional information field generated as a result of compressing the header by using the lossless compression algorithm, and extracting the additional information; restoring the compressed header to the original header; and receiving a transport stream packet including the original header and decoding the transport stream packet to generate the image data.

According to another aspect of the present invention, a computer-readable medium having embodied thereon a computer program for executing the image transmitting method, receiving the image data and encoding the image data to a transport stream packet including a header; compressing the header in the transport stream packet by the lossless compression algorithm; and inserting additional information in an additional information field generated as a result of compressing the header by using the lossless compression algorithm.

According to another aspect of the present invention, a computer-readable medium having embodied thereon a computer program for executing the image receiving method, the method including receiving a transport stream packet including a header compressed by using a lossless compression algorithm and additional information inserted in an additional information field generated as a result of compressing the header by using the lossless compression algorithm, and extracting the additional information; restoring the compressed header to the original header; and receiving a transport stream packet including the original header and decoding the transport stream packet to generate the image data.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

The present invention will now be described more fully with reference to the accompanying drawings, in which exemplary embodiments of the invention are shown.

Figure 1:
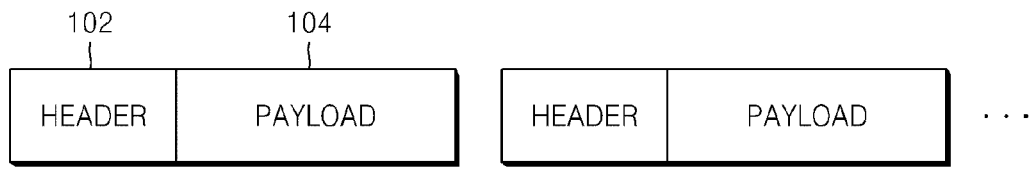
FIG. 1 illustrates a transport stream structure of general image data.
Figure 2:
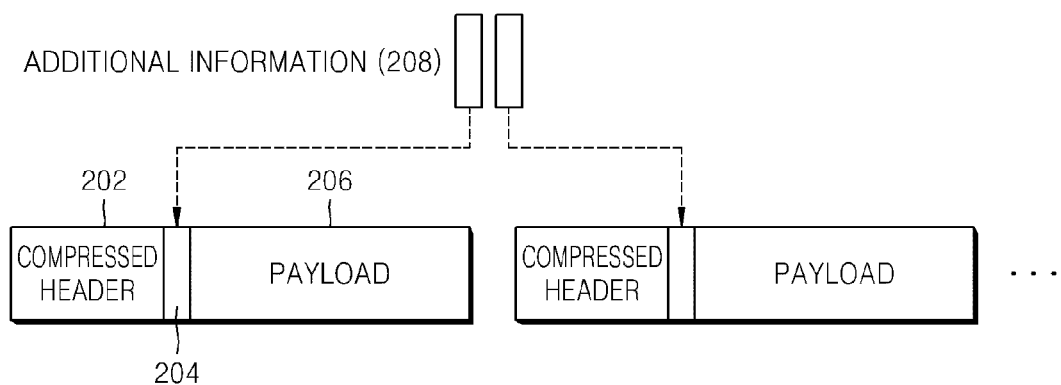
FIG. 2 illustrates a transport stream structure of image data according to an exemplary embodiment of the present invention.

FIG. 2 illustrates a transport stream structure of image data according to an exemplary embodiment of the present invention.

Referring to FIG. 2, the transport stream structure of image data includes a compressed header 202, an additional information field 204, and a payload 206.

The compressed header 202 is derived from an original header constituting a general transport stream structure of image data by compressing the original header by a lossless compression algorithm. The lossless compression algorithm is a compression algorithm that allows all of the exact original data to be reconstructed from the compressed original data. Such a compression algorithm may be a Huffman algorithm, a deflate algorithm, an arithmetic coding algorithm, or an entropy coding algorithm.

For instance, although a header in an MPEG2 (Moving Picture Experts Group 2) transport stream packet is designed to have a minimum length in terms of expressing information, it is not designed to have a minimum entropy in terms of an entropy. Thus, the size can be reduced more by the lossless compression algorithm such as the Huffman algorithm, a deflate algorithm, an arithmetic coding algorithm, or an entropy coding algorithm.

For example, when a header in the MPEG2 transport stream packet is compressed by using the deflate algorithm, the size of the compressed header is reduced by between 90% and 95% of the original size of the header. Thus, provided that 10 headers (the size of a header per MPEG2 transport stream packet is four bytes) are compressed and 10% more free space is available due to the compression of each header, 4 bytes of a free space is then made. Also, if a transport stream packet having a time-stamp such as an Advanced Television System Committee (ATSC) method inserted, is compressed, the free space will be even larger.

The additional information field 204 is an area that is generated as the original header is compressed, and thus its size is reduced. A size of the additional information field 204 is obtained by subtracting the size of a compressed header derived by the lossless compression algorithm from the original size of the header. In this additional information field 204, various types of additional information can be inserted according to the needs of users. Additional information 208 is inserted into a part where the original header is compressed and its size is reduced, and therefore the size of an entire transport stream packet is not changed.

The payload 206 is a part including image data which a user wants to transmit.

The additional information 208 may be various types of information such as subtitle information for an image that is to be transmitted.

If the size of the additional information 208 that is to be inserted is larger than the size of the additional information field 204, the additional information 208 can be segmented according to the size of the additional information field 204 and inserted.

Also, it is possible to realize a system in which not only all transmitting headers in transport stream packets are compressed, but also a predetermined number of headers according to the size of the inserted additional information are compressed.

Figure 3:
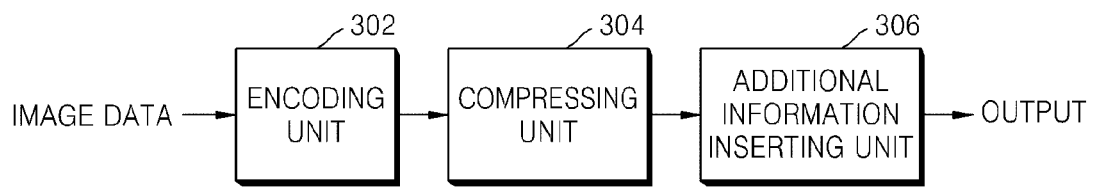
FIG. 3 illustrates an apparatus for transmitting image data according to an exemplary embodiment of the present invention.

FIG. 3 illustrates an apparatus for transmitting image data according to an exemplary embodiment of the present invention.

Referring to FIG. 3, the apparatus for transmitting image data includes an encoding unit 302, a compressing unit 304, and an additional information inserting unit 306.

The encoding unit 302 receives image data and encodes it to generate a transport stream packet including a header. For example, an MPEG compression image can be encoded to a 188 byte MPEG2 transport stream packet including a header.

The compressing unit 304 compresses the header in the transport stream packet input from the encoding unit 302 by using the lossless compression algorithm.

However, in the case of the MPEG compression image, a payload in a transport stream packet is not compressed because of its low compression rate. The lossless compression algorithm includes algorithms in which the original data is not lost during restoration after compression, such as the Huffman algorithm, the deflate algorithm, the arithmetic coding algorithm, and the entropy coding algorithm.

If the size of additional information to be inserted is smaller than a free space made by the compression of the header, the compressing unit 304 may reduce the number of headers required to be compressed.

The additional information inserting unit 306 inserts additional information into a free space where an area for a compressed header is subtracted from the original area for a header. Thus, even though the additional information is inserted, the size of the transport stream packet is not changed. The additional information may include various types of information such as subtitle information.

If the size of additional information to be inserted is larger than a free space made by the compression of the header, the additional information inserting unit 306 segments the additional information and inserts them into each transport stream packet.

Figure 4:
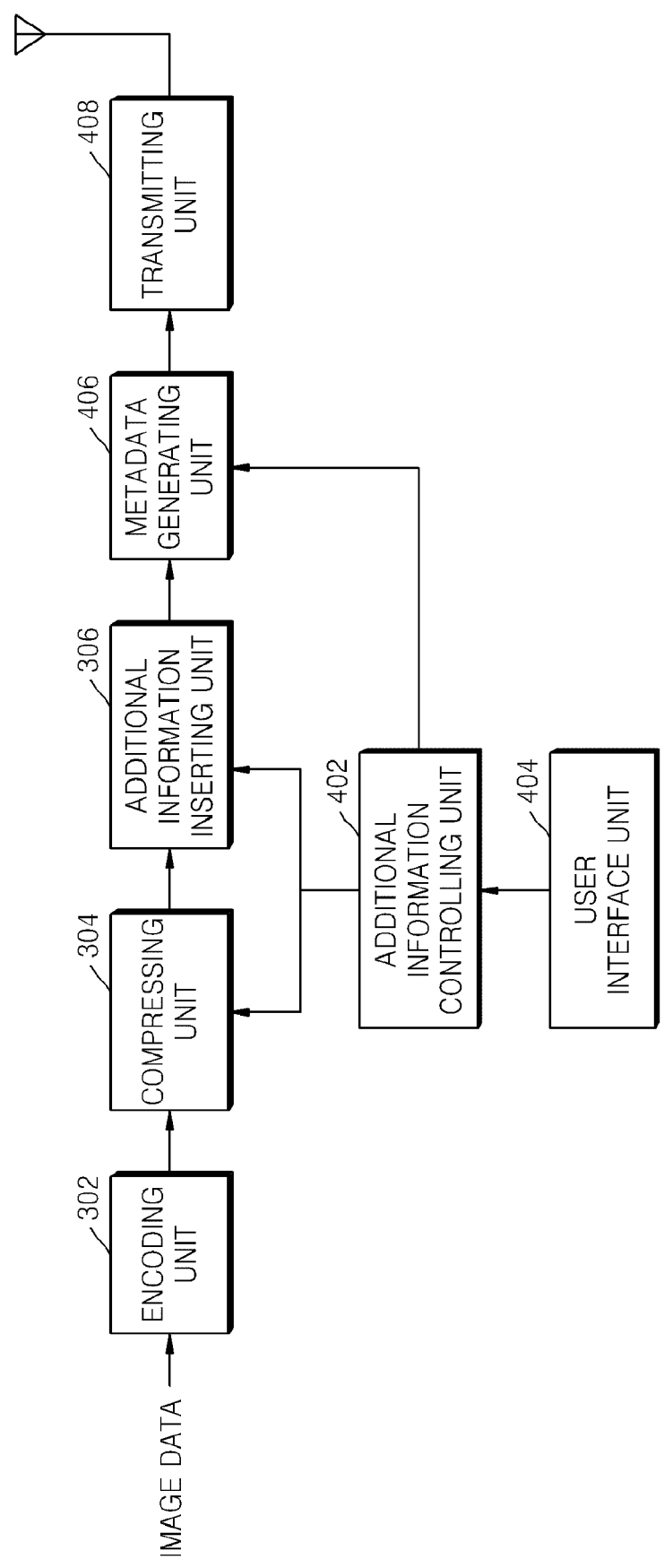
FIG. 4 illustrates an apparatus for transmitting image data according to another exemplary embodiment of the present invention.

FIG. 4 illustrates an apparatus for transmitting image data according to another exemplary embodiment of the present invention.

Referring to FIG. 4, the apparatus for transmitting image data includes an encoding unit 302, a compressing unit 304, an additional information inserting unit 306, an additional information controlling unit 402, a user interface unit 404, a metadata generating unit 406, and a transmitting unit 408.

The encoding unit 302, the compressing unit 304, and the additional information inserting unit 306 have been previously explained with reference to FIG. 3, and therefore a detailed explanation thereof will be omitted here.

The additional information controlling unit 402 provides enable signals to the compressing unit 304 and the additional information inserting unit 306 when there is additional information to be transmitted. The compressing unit 304 and the additional information inserting unit 306 only compress a header and insert the additional information when the enable signals are input from the additional information controlling unit 402. On the other hand, if the enable signal are not input from the additional information controlling unit 402, the compressing unit 304 and the additional information inserting unit 306 output an existing transport stream packet without compressing a header.

Thus, when additional information is input, the additional information controlling unit 402 determines how many transport stream packets are to be compressed, and accordingly provides enable signals to the compressing unit 304 and the additional information inserting unit 306. However, if all headers of transport stream packets are to be compressed, the additional information controlling unit 402 may not be included.

The user interface unit 404 provides an interface for receiving the additional information to be inserted by the user using the additional information inserting unit 306. The user interface unit 404 can be connected to the additional information controlling unit 402 as illustrated in FIG. 4, or can be directly connected to the additional information inserting unit 306 without going through the additional information controlling unit 402 when compressing headers in all transport stream packets without the additional information controlling unit 402.

The metadata generating unit 406 generates metadata indicating the number of transport stream packets into which additional information is inserted. The metadata does not necessarily have to be included in the transport stream packets, but can be transmitted prior to transmission of transport stream packets according to an exemplary embodiment of the present invention. The metadata generating unit 406 receives the number of transport stream packets that include compressed headers from the additional information controlling unit 402, and generates metadata indicating the number of transport stream packets that include the compressed header.

The transmitting unit 408 transmits metadata and transport stream packets output from the additional information inserting unit 306 through the metadata generating unit 406. Also, it is possible to store the metadata and the transport stream packets without transmitting them.

Figure 5:
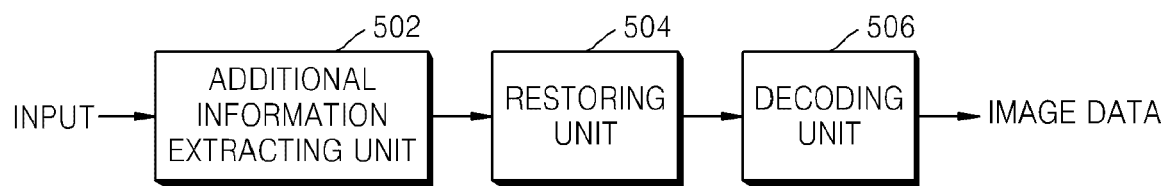
FIG. 5 illustrates an apparatus for receiving image data according to an exemplary embodiment of the present invention.

FIG. 5 illustrates an apparatus for receiving image data according to an exemplary embodiment of the present invention.

Referring to FIG. 5, the apparatus for receiving image data includes an additional information extracting unit 502, a restoring unit 504, and a decoding unit 506.

The additional information extracting unit 502 receives a transport stream packet including a header compressed by the lossless compression algorithm and additional information, and extracts the additional information. The additional information, for example, subtitle information, is transmitted to reproducing apparatuses (not shown) without being output to the restoring unit 504.

The restoring unit 504 restores a header compressed by the lossless compression algorithm to an original header which is not compressed. Thus, even though additional information is extracted, the size of a transport stream packet is not changed.

The decoding unit 506 receives the transport stream packet including the original header which is restored at the restoring unit 504 and decodes it to obtain the image data.

Figure 6:
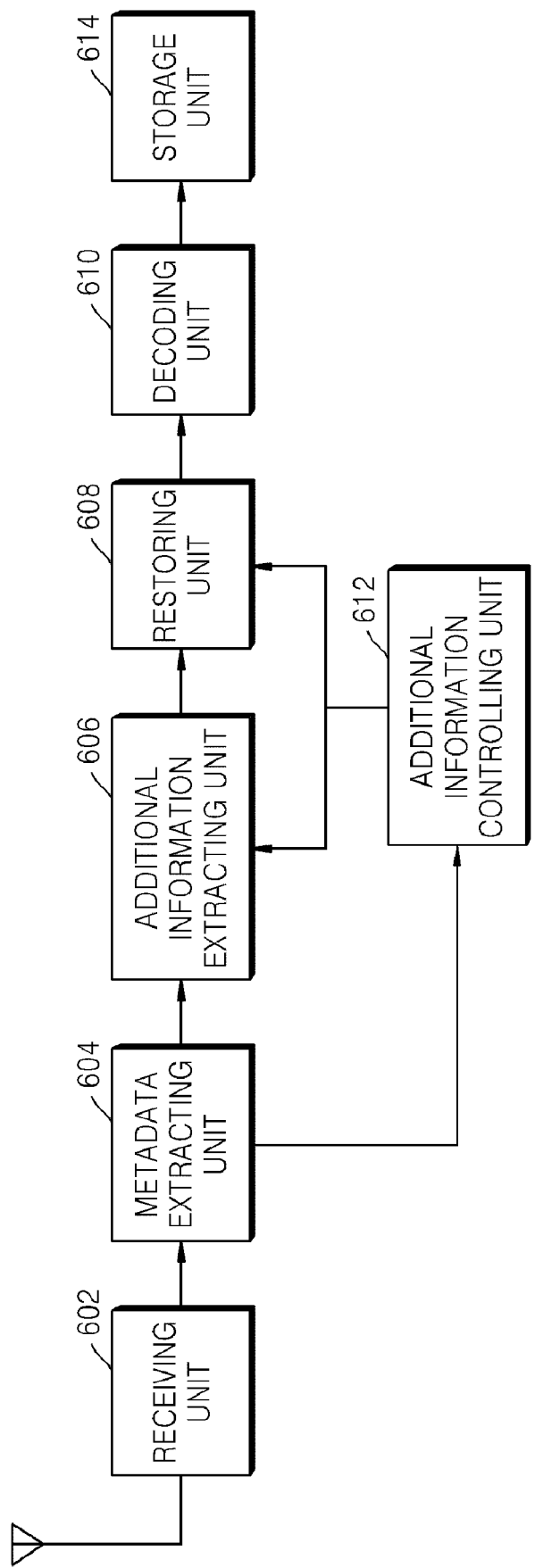
FIG. 6 illustrates an apparatus for receiving image data according to another exemplary embodiment of the present invention.

FIG. 6 illustrates an apparatus for receiving image data according to another exemplary embodiment of the present invention.

Referring to FIG. 6, the apparatus for receiving image data includes a receiving unit 602, a metadata extracting unit 604, an additional information extracting unit 606, a restoring unit 608, a decoding unit 610, an additional information controlling unit 612, and a storage unit 614.

The additional information extracting unit 606, the restoring unit 608, and the decoding unit 610 are almost the same as the additional information extracting unit 502, the restoring unit 504, and the decoding unit 506 which have been previously explained with reference to FIG. 5, and therefore a detailed explanation thereof will be omitted here. However, the additional information extracting unit 606 and the decoding unit 608 only extract additional information and restore a compressed header when enable signals are received from the additional information controlling unit 612. A detailed explanation of this procedure will be given hereinafter.

The receiving unit 602 receives a transport stream packet and metadata including a header and additional information compressed by the lossless compression algorithm.

The metadata extracting unit 604 extracts metadata indicating the number of transport stream packets having additional information inserted before the additional information is extracted by the additional information extracting unit 606. The extracted metadata is output to the additional information controlling unit 612 and the additional information controlling unit 606.

The additional information controlling unit 612 provides enable signals to the additional information extracting unit 606 and the restoring unit 608, based on the metadata on the number of transport stream packets having the additional information input from the metadata extracting unit 604 inserted. In other words, when a transport stream packet having no additional information inserted is input to the additional information extracting unit 606 and the restoring unit 608, the additional information controlling unit 612 does not enable the additional information extracting unit 606 and the restoring unit 608. In this case, the additional information extracting unit 606 and the restoring unit 608 output the input transport stream packet.

The storage unit 614 stores image data decoded by the decoding unit 610. Also, the storage unit 614 may directly transmit the decoded image data to reproducing apparatuses (not shown) without storing the decoded image data.

Figure 7:
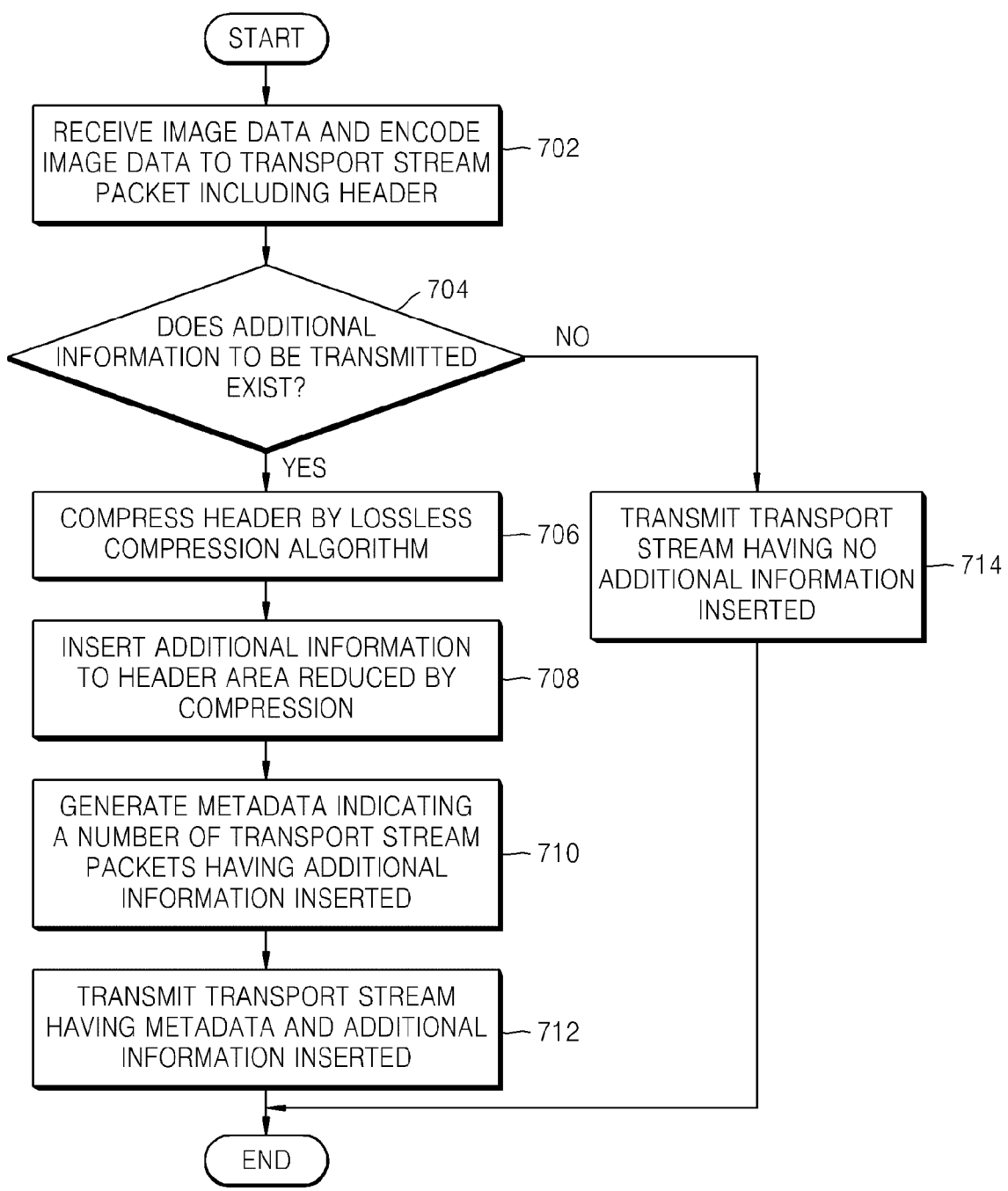
FIG. 7 is a flowchart illustrating a method of transmitting image data according to an exemplary embodiment of the present invention.

FIG. 7 is a flowchart illustrating a method of transmitting image data according to an exemplary embodiment of the present invention.

Referring to FIG. 7, in operation 702, image data is received and encoded to a transport stream packet that includes a header.

In operation 704, it is determined whether additional information to be transmitted exists. If there is additional information, operation 706 is performed, and if there is no additional information, operation 714 is performed.

In operation 714, if there is no additional information, the header in the transport stream packet is not compressed and transport stream packets are transmitted without additional information being inserted.

In operation 706, if there is additional information to be transmitted, the header in the transport stream packet is compressed by the lossless compression algorithm.

In operation 708, additional information in a size where the size of the compressed header is subtracted from the original size of the header is inserted into a transport stream packet. If the size of the additional information is large, the additional information can be inserted into a plurality of transport stream packets.

In operation 710, the number of transport stream packets having additional information inserted is calculated, and metadata indicating the number of calculated transport stream packets is generated.

In operation 712, a transport stream having the metadata and the additional information inserted is transmitted.

Figure 8:
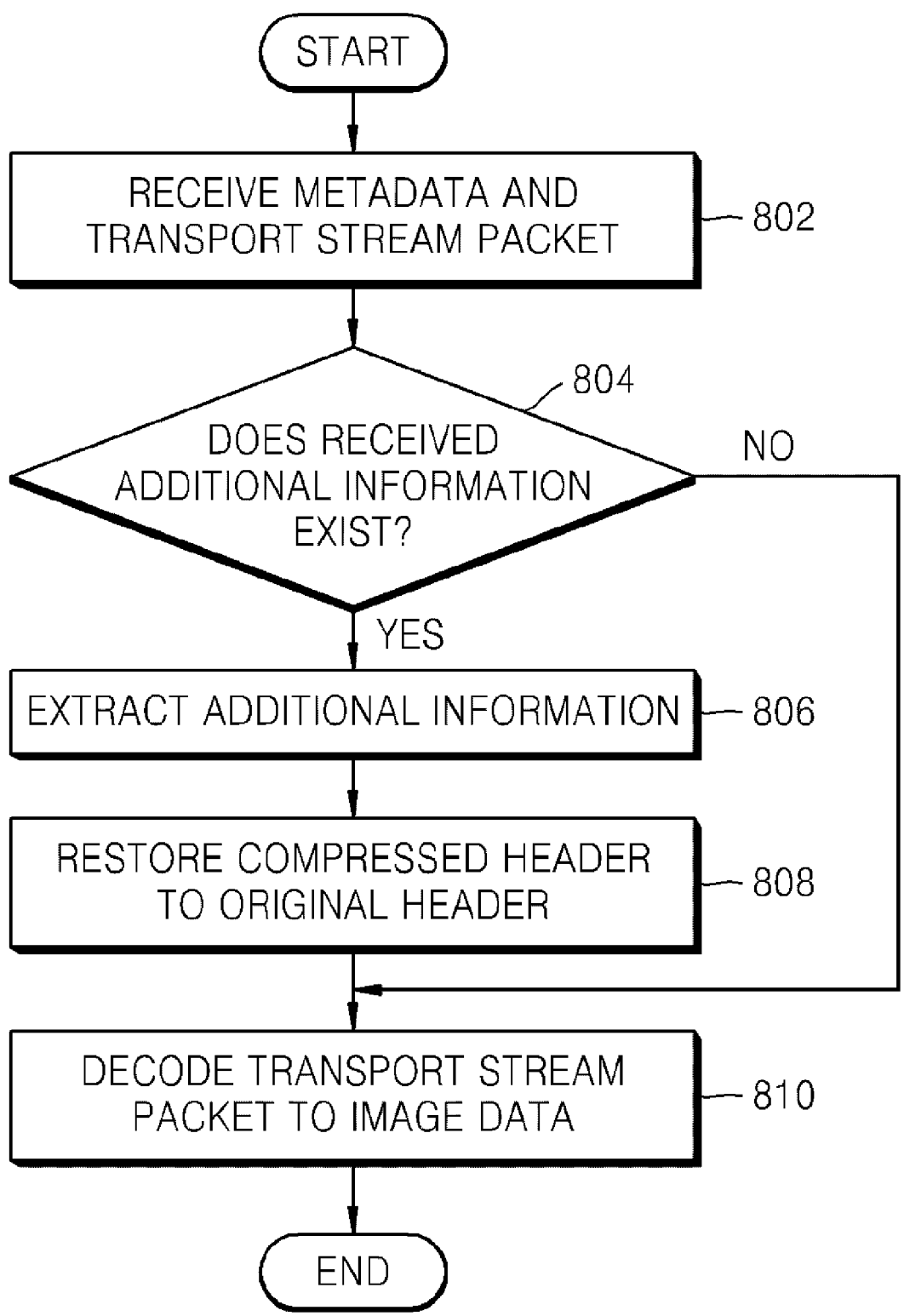
FIG. 8 is a flowchart illustrating a method of receiving image data according to an exemplary embodiment of the present invention.

FIG. 8 is a flowchart illustrating a method of receiving image data according to an exemplary embodiment of the present invention.

Referring to FIG. 8, in operation 802, a transport stream packet that includes a header compressed by the lossless compression algorithm and additional information is received.

In operation 804, it is determined whether there exists additional information in the received transport stream. If there is received additional information, operation 806 is performed, and if there is no received additional information, operation 810 is performed.

The determination on whether the received additional information exists is made based on received metadata after receiving the metadata indicating the number of transport stream packets having additional information inserted.

In operation 806, a transport stream packet including the compressed header and additional information is input and the additional information is extracted.

In operation 808, the compressed header is restored to an original header which is not compressed.

In operation 810, a transport stream packet including the original header which is not compressed is input and decoded to image data.

The invention can also be embodied as computer readable codes to be recorded on a computer readable recording medium or to be transmitted through a transmission medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The transmission medium can include carrier waves (e.g., transmission through the Internet). The computer readable recording medium can also be distributed over network coupled computer systems so that the computer readable code is stored and executed in a distributed fashion.

As described above, according to the present invention, there are provided a transport stream structure of image data, a transmitting and receiving apparatus and method thereof, which are capable of inserting additional information without changing the size of the related art transport stream structure of image data.

Also, according to the present invention, a transport stream structure of image data, and a method and apparatus for transmitting and receiving thereof are capable of providing additional functions which are not supported by the related art transport stream structures of image data, by inserting additional information.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-transitory computer readable recording medium which stores image data having a transport stream structure, the structure being produced by:
    generating a header that comprises control information for reproducing the image data, and is compressed by using a lossless compression algorithm;
    generating an additional information field that comprises additional information of the image data, and is generated based on compressing the header by using the lossless compression algorithm; and
    generating a payload that includes the image data.

2. The computer readable recording medium of claim 1, wherein a size of the additional information field is obtained by subtracting a size of the header compressed by the using the lossless compression algorithm from an original size of the header in a state before compressing the header by using the lossless compression algorithm.

3. The computer readable recording medium of claim 1, wherein the additional information comprises subtitle information of the image data.

4. The computer readable recording medium of claim 1, wherein the image data is compressed by at least one of a Moving Picture Experts Group (MPEG) and an H.264 standard.

5. The computer readable recording medium of claim 1, wherein the lossless compression algorithm comprises at least one of a Huffman algorithm, a deflate algorithm, an arithmetic coding algorithm, and an entropy coding algorithm.

6. An apparatus for transmitting image data, the apparatus comprising:
   an encoding unit that receives the image data and encodes the image data to generate a transport stream packet comprising a header that comprises control information for reproducing the encoded image data;
   a compressing unit that compresses the header by using a lossless compression algorithm; and
   an additional information inserting unit that inserts additional information of the image data in an additional information field that is generated in the transport stream packet based on compressing the header by using the lossless compression algorithm.

7. The apparatus of claim 6, wherein a size of the additional information field is obtained by subtracting a size of the header compressed by the using the lossless compression algorithm from an original size of the header in a state before compressing the header by using the lossless compression algorithm.

8. The apparatus of claim 7, further comprising an additional information controlling unit that determines if another header needs to be compressed by using the lossless compression algorithm according to a size of the additional information to be inserted,
   wherein the other header comprises another control information for reproducing the image data, and is included in another transport stream packet for the image data.

9. The apparatus of claim 8, wherein if the size of the additional information to be inserted is larger than the size of the additional information field, the compressing unit compresses the other header, segments the additional information to be inserted, and inserts the segmented additional information into the transport stream packet and the other transport stream packet.

10. The apparatus of claim 6, wherein the additional information comprises subtitle information of the image data.

11. The apparatus of claim 6, further comprising a transmitting unit that transmits the transport stream packet output from the additional information inserting unit.

12. The apparatus of claim 6, further comprising a storage unit that stores the transport stream packet comprising the additional information inserted.

13. The apparatus of claim 6, further comprising a user interface unit that provides an interface for receiving the additional information to be inserted by a user using the additional information inserting unit.

14. The apparatus of claim 6, further comprising an additional information controlling unit that enables the compressing unit and the additional information inserting unit only if there is the additional information to be transmitted with the image data.

15. The apparatus of claim 14, further comprising a metadata generating unit that generates metadata indicating a number of transport stream packets comprising the transport stream packet that have the additional information inserted.

16. The apparatus of claim 6, wherein the image data is compressed by at least one of a Moving Picture Experts Group (MPEG) and an H.264 standard.

17. The apparatus of claim 6, wherein the lossless compression algorithm comprises at least one of a Huffman algorithm, a deflate algorithm, an arithmetic coding algorithm, and an entropy coding algorithm.

18. An apparatus for receiving image data, the apparatus comprising:
   an additional information extracting unit that receives a first transport stream packet comprising a header and additional information of the image data, and extracts the additional information,
   wherein the header comprises control information for reproducing the image data and is compressed by using a lossless compression algorithm, and the additional information is included in an additional information field of the first transport stream packet generated based on compressing the header by using the lossless compression algorithm;
   a restoring unit that restores the compressed header to an original header in a state before compressing the header by using the lossless compression algorithm, and generates a second transport stream packet comprising the original header; and
   a decoding unit that receives and decodes the second transport stream packet to obtain the image data.

19. The apparatus of claim 18, wherein a size of the additional information field is obtained by subtracting a size of the header compressed by the using the lossless compression algorithm from a size of the original header.

20. The apparatus of claim 18, wherein the additional information comprises subtitle information of the image data.

21. The apparatus of claim 18, further comprising a receiving unit that receives and transmits the first transport stream packet to the additional information inserting unit.

22. The apparatus of claim 18, further comprising a storage unit that stores the obtained image data decoded by the decoding unit.

23. The apparatus of claim 18, further comprising a metadata extracting unit that extracts metadata indicating a number of transport stream packets including the first transport stream packet that comprise the additional information inserted.

24. The apparatus of claim 18, further comprising an additional information controlling unit that enables the additional information extracting unit and the restoring unit, based on the extracted metadata.

25. The apparatus of claim 18, wherein the image data is compressed by at least one of a Moving Picture Experts Group (MPEG) and an H.264 standard.

26. The apparatus of claim 18, wherein the lossless compression algorithm comprises at least one of a Huffman algorithm, a deflate algorithm, an arithmetic coding algorithm, and an entropy coding algorithm.

27. A method of transmitting image data, the method comprising:
   receiving the image data and encoding the image data to generate a transport stream packet comprising a header that comprises control information for reproducing the encoded image data;
   compressing the header by using a lossless compression algorithm; and
   inserting additional information of the image data in an additional information field that is generated in the transport stream packet based on the compressing the header by the using the lossless compression algorithm.

28. The method of claim 27, wherein a size of the additional information field is obtained by subtracting a size of the header compressed by the using the lossless compression algorithm from an original size of the header in a state before the compressing the header by the using the lossless compression algorithm.

29. The method of claim 28, further comprising determining if another header needs to be compressed by using the lossless compression algorithm according to a size of the additional information to be inserted,
wherein the other header comprises another control information for reproducing the image data and is included in another transport stream packet for the image data.

30. The method of claim 29, further comprising, if the size of the additional information to be inserted is larger than the size of the additional information field:
compressing the other header;
segments the additional information to be inserted; and
inserting the segmented additional information into the transport stream packet and the other transport stream packet.

31. The method of claim 27, wherein the additional information comprises subtitle information of the image data.

32. The method of claim 27, further comprising determining whether there exists the additional information to be inserted, prior to the compressing the header.

33. The method of claim 32, further comprising:
calculating a number of transport stream packets including the transport stream packet that comprise the additional information inserted; and
generating metadata indicating a number of the transport stream packets.

34. The method of claim 27, further comprising storing the transport stream packet comprising the metadata and the additional information inserted.

35. The method of claim 27, further comprising providing an interface that receives the additional information to be inserted from a user.

36. The method of claim 27, wherein the image data is compressed by at least one of a Moving Picture Experts Group (MPEG) and an H.264 standard.

37. The method of claim 27, wherein the lossless compression algorithm comprises at least one of a Huffman algorithm, a deflate algorithm, an arithmetic coding algorithm, and an entropy coding algorithm.

38. A method of receiving image data, the method comprising:
receiving a first transport stream packet comprising a header and additional information of the image data, and extracting the additional information,
wherein the header comprises information for reproducing the image data and is compressed by using a lossless compression algorithm, and the additional information is included in an additional information field of the transport stream packet generated based on the compressing the header by the using the lossless compression algorithm;
restoring the compressed header to an original header in a state before the compressing the header by the using the lossless compression algorithm, and generating a second transport stream packet comprising the original header; and
receiving and decoding the second transport stream packet to obtain the image data.

39. The method of claim 38, wherein a size of the additional information field is obtained by subtracting a size of the header compressed by the using the lossless compression algorithm from a size of the original header.

40. The method of claim 38, wherein the additional information comprises subtitle information of the image data.

41. The method of claim 38, further comprising storing the obtained image data by the decoding.

42. The method of claim 38, further comprising determining whether the additional information exists in the first transport stream packet, prior to the extracting the additional information.

43. The method of claim 42, wherein the determining whether the additional information exists in the first transport stream packet comprises:
receiving metadata indicating a number of transport stream packets including the first transport stream packet that comprise the additional information inserted; and
determining whether the additional information exists in the first transport stream packet, based on the received metadata.

44. The method of claim 38, wherein the image data is compressed by at least one of a Moving Picture Experts Group (MPEG) and an H.264 standard.

45. The method of claim 38, wherein the lossless compression algorithm includes at least one of a Huffman algorithm, a deflate algorithm, an arithmetic coding algorithm, and an entropy coding algorithm.

46. A non-transitory computer-readable medium having embodied thereon a computer program for executing the image transmitting method of claim 27.

47. A non-transitory computer-readable medium having embodied thereon a computer program for executing the image receiving method of claim 38.

* * * * *